Patented Sept. 12, 1944

2,357,895

UNITED STATES PATENT OFFICE 2,357,895

PROCESSING OF FRUIT JUICES

Ralph H. Higby, Ontario, Calif., assignor to California Fruit Growers Exchange, Los Angeles, Calif., a corporation of California No Drawing. Application October 8, 1941, Serial No. 414,209

8 Claims. (Cl. 99—155)

The present invention comprises a process which makes possible the commercial canning or other packaging of navel orange juice. Accordingly, an object of the invention is to provide and disclose methods and means for canning or otherwise packaging navel orange juice to produce a commercially satisfactory product.

Another and further object is to provide and disclose methods and means for the production of satisfactory canned navel orange juice in which processes the fruit and juice are so handled as to keep at a minimum the bitter-forming substances in the juice, and the tendency of these substances to change into bitter principles is also kept at a minimum.

Other and further objects, uses, benefits, and advantages of the invention will appear more fully hereinafter in part, in part will be obvious to those skilled in the art, and in part will appear from a contemplation of the application of the invention in practice, and from the appended claims.

In canning juice of the navel orange, the following precautions should be observed and the following steps taken:

1. The fruit used must be reasonably mature.
2. The navel formation should be trimmed off before extraction of the juice, or at least crushing or maceration of this portion of the fruit must be avoided.
3. The juice should be burred out in a manner calculated to reduce to a minimum the maceration of the section coverings, center bundle, and albedo.
4. The juice should be screened carefully immediately after extraction.
5. The juice should be buffered immediately to pH 3.8 to 4.0, or very close to this region.
6. Thorough deaeration by any of the means that have been commonly available for many years is a sound practice and should be employed, and employed before pasteurization treatment of the juice.
7. The canning or other packaging procedure, which need not necessarily follow pasteurization, must not allow any admixture or reabsorption of air into the juice.

The Washington Navel orange has never been used very extensively for the manufacture of canned juice because of the bitter taste and astringency which develop in the juice from this variety when it is allowed to stand. This bitterness is most pronounced when the juice is exposed to air or when it is pasteurized. The degree of this bitterness is largely dependent upon the maturity of the fruit, most pronounced in early season but often disappearing entirely with warmer weather in later Spring.

Two chemical substances are responsible for the bitterness in navel orange juice: limonin, occurring in fruit of commercial maturity, and isolimonin, probably a parent substance, which I have found only in very immature fruit. These substances, it should be noted, are not related to naringin, the bitter principle of grapefruit.

Limonin ($C_{26}H_{30}O_8$), with a melting point of 291° to 292° C., is a white crystalline substance, soluble in acetone, benzene, and alcohol; but relatively insoluble in water. It is very bitter. A solution of one part in 100,000 parts of water will have a distinct bitter taste. It does form tasteless salts with the alkali and alkaline earth metals, but it should be particularly noted that these decompose at pH values below 7.0 and release the bitter principle.

In the fruit itself limonin is found in the albedo, the center bundle, and the veins of the section coverings, but not in the juice as such. In these fruit tissues it occurs in water-soluble, non-bitter form, probably as one part of an easily hydrolyzed saccharide complex. In contact with the acid juice of the fruit, this complex is split and the bitter principle is very shortly released. The presence of atmospheric oxygen in the juice apparently accelerates this hydrolysis, causing more rapid bitter development. I do not understand the role of oxygen in promoting this reaction.

In addition to the above sources of the bitter principle, I have found that when the fruit is carefully sliced and the navel halves and the stem halves are separately extracted, the juice from the navel halves has much more bitterness and astringency than the juice from the stem halves. I rather doubt that this result is due to the occurrence of greater concentrations of bitter substance in the juice of the navel end of the fruit, for I have found that by slicing off the end of the fruit just back of the navel formation and burring the remainder of the fruit, much bitterness can be avoided without greatly decreasing the yield of juice. Of course, any means of extraction which avoids grinding and maceration of the protuberant navel formation within the fruit produces an equivalent result.

Since the bitter-forming substance is not contained in the juice itself but in the albedo, in the center bundle, and in the veins of the fibrovascular system, bitterness in the extracted juice is dependent upon the grinding and maceration of these tissues with the juice, and upon prolongation of the time of contact. Practically, it is, of course, impossible to prevent completely the extraction of the bitter-forming substance, but by the use of suitable burring and screening equipment this can be greatly minimized.

As one means of preventing maceration of the pulp during burring, I have devised a skeleton burr which allows the pulp and juice to drop away from the peel freely without any appreciable grinding action. A further advantage of this type of burr is that it reams the fruit much more rapidly and easily than the ordinary solid burr.

From the burring machine I prefer to have the juice drop immediately upon a vibrating, self-cleaning continuous screen which makes an immediate separation of juice from pulp. I prefer to use a screen of about 20 mesh.

One theoretical means of possibly preventing the formation of the bitter or, rather, release of the bitter principle in the juice would be to neutralize the juice to pH 7 or above, since the bitter substances form nonbitter salts at or above pH 7. Obviously, however, such juice will have lost its taste characteristics as citrus juice.

I have discovered that if enough of a suitable compound, say lithium or sodium carbonate, be added to the juice to adjust the pH to approximately 3.8 to 4.0, the development of the bitter taste will be very substantially reduced without imparting any objectionable foreign taste to the juice. Lithium carbonate is somewhat preferable to sodium carbonate as a buffering salt, since it seems to give less salty taste. However, at present the lithium compound is somewhat more costly.

Other specific compounds may be employed, such as bicarbonates, or, for example, citrates, the latter of which actually occur naturally in the juice. The advantages of the carbonate method of buffering as compared with the citrate are two-fold. In the first place, lesser amounts of buffer are required to adjust to the desired pH, and the carbon dioxide released is of value in sweeping the juice free of oxygen and protecting against oxidation during processing.

I prefer to meter the required amount of buffer solution of suitable concentration, say 10%, directly into the juice as it comes from the continuous screen.

The importance and many of the advantages of careful deaeration of citrus juices have been known for many years, and I desire to make use of this step for all of its advantages, and particularly because I have shown to my own satisfaction that thorough deaeration will reduce the rate of bitter formation. Any of the means that have been commonly available for this purpose for many years may be employed. Preferably, I draw the juice immediately after burring and screening into a deaeration tank under full vacuum to remove the air and most of the carbon dioxide. When deaeration is satisfactorily complete, the vacuum on the tank may be broken with carbon dioxide or nitrogen and the juice pasteurized, filled into cans, sealed, and cooled.

It is possible to pasteurize in the can. However, for the best prevention of hydrolysis of the bitter-forming substance, the heat treatment should be limited to the shortest possible time. Obviously, this can best be done by the use of a continuous flash pasteurizer. The juice may then be run into the cans hot, the cans sealed and inverted for 30 seconds or so to sterilize the lids, and then be cooled as rapidly as possible.

For the best finished product, I prefer of course, in connection with the pasteurization steps, to employ the process for rendering substantially permanent the uniform dispersion in the juice of the finely divided pulp solids, sometimes called "stabilization of cloud" and described in U. S. Patent 2,217,261.

The filling equipment must be designed so that as little air as possible is mixed with the juice during the filling operation. One satisfactory procedure utilizes a long filling spout which reaches to the bottom of the can and allows the juice to flow in without splashing and the consequent entrainment of air. The can is preferably filled completely, so that upon application of the lid no air space remains, although a little of the juice is splashed out. Some of the improved vacuum and inert gas canning equipment now available, when very carefully operated and controlled, will give good air-free juice in the can.

Many suggestions have been made for reducing or preventing the development of bitter flavor in navel juice and many expedients have been tried, all relatively unsuccessfully.

For example, fresh whole fruit has been heated to 120° F. or thereabouts for varying periods in the hope that accelerated respiration might destroy the bitter principle, but without substantial effect.

Fresh fruit has been stored in a carbon dioxide atmosphere to force anaerobic respiration, thus using up all the available oxygen in the fruit. This means, also, gives a bitter juice, and, in addition, the juice has an off flavor.

Fresh fruit has been deaerated, chilled, and carbonated while still in the whole state to prevent occurrence of oxidation during burring and subsequent standing. While it is possible actually to carbonate the whole fruit and recover a somewhat carbonated juice, results seem to be negative so far as preventing formation of bitter flavor by this means.

Attempts have been made to destroy the bitter substances by degradation by treating the juice with glucoside-splitting enzymes, such as emulsin and myrosin, but these efforts have, up to the present, been unsuccessful.

With my preferred process, however, and using reasonably mature fruit, it is possible to prepare canned navel orange juice which compares favorably with the best canned Valencia juice, both in initial flavor and in keeping quality. For example, samples stored at 100° F. for 30 days showed no increase in bitterness, although they did show some staleness of flavor, as any canned orange juice will do when so treated. Samples held at 35° F. have remained fresh and good without bitterness or other objectionable off-flavor development over very much longer periods of time.

A most satisfying beverage may be made from a mixture of grapefruit juice and navel orange juice prepared in accordance with the process which has been described. This and like mixtures I intend to come within the terms of the claims.

Having thus described my invention in such full, clear, and complete detail as to enable others skilled in the art to make, use, and practice the same, I claim as my invention and desire to secure by Letters Patent the following:

1. The process of preparing a canned navel orange juice product substantially free from the natural tendency to develop characteristic bitter flavor upon standing, which comprises the steps of trimming away the navel portion of the fruit, burring out the juice with minimum maceration of section coverings, center bundle, and albedo, and immediately screening the juice for removal of pulp, and buffering the juice to a pH of about 3.8 to 4.0, thoroughly deaerating the juice, and pasteurizing and canning in the substantial absence of air.

2. In a process for the preparation of navel orange juice, the steps of removing the juice from the fruit with a minimum maceration of the bitter parts of the fruit and adding a buffer to the juice to bring the pH of the juice to approximately 3.8 to 4.0.

3. A process for the preparation of packaged navel orange juice, which comprises the steps of removing the juice from the fruit with a minimum maceration of the navel portion, section coverings, center bundle, and albedo, and immediately removing a substantial portion of the pulp from the extracted juice and buffering the juice to a pH of about 3.8 to 4, thoroughly deaerating the juice, followed by pasturization and packaging in the substantial absence of air.

4. In the process of preparing navel orange juice, the step of adding a buffer to bring the pH to approximately 3.8 to 4.0.

5. A new citrus juice product comprising buffered navel orange juice having a pH between 3.8 and 4.0.

6. A process for the preparation of packaged navel orange juice which comprises the steps of removing the juice from the fruit with minimum maceration of the navel portion, section coverings, center bundle, and albedo, removing a substantial portion of the pulp from the extracted juice, buffering the juice to within a pH range of about 3.8 to 4 by the addition of lithium carbonate, deaerating the juice, followed by pasteurization and packaging in the substantial absence of air.

7. In a process of preparing navel orange juice the steps of adding a buffer comprising lithium carbonate to bring the pH of the juice to 3.8 to 4.0.

8. A new citrus juice product comprising buffered navel orange juice containing lithium and having a pH between 3.8 and 4.0.

RALPH H. HIGBY.